(12) United States Patent
Crescenzi

(10) Patent No.: US 6,726,585 B1
(45) Date of Patent: Apr. 27, 2004

(54) VARIABLE RATIO SPROCKET ASSEMBLY

(76) Inventor: Marco E. Crescenzi, 116 Beatrice Way, Woodbridge, Ontario (CA), L4L 4N3

( * ) Notice: Subject to any disclaimer, the term of this patent is extended or adjusted under 35 U.S.C. 154(b) by 67 days.

(21) Appl. No.: 09/960,051

(22) Filed: Sep. 21, 2001

(51) Int. Cl.[7] .................................................. F16H 9/02
(52) U.S. Cl. ........................................ 474/49; 474/160
(58) Field of Search ............................. 474/47, 49, 52, 474/160

(56) References Cited

U.S. PATENT DOCUMENTS

| | | | |
|---|---|---|---|
| 3,800,613 A | | 4/1974 | Clark |
| 4,498,351 A | * | 2/1985 | Ahoor .......................... 74/439 |
| 4,696,662 A | * | 9/1987 | Gummeringer .............. 474/49 |
| 4,740,190 A | | 4/1988 | Pike |
| 4,772,250 A | * | 9/1988 | Kovar et al. ................. 474/47 |
| 4,850,939 A | | 7/1989 | Chilcote et al. |
| 4,961,719 A | | 10/1990 | Wildermuth |
| 4,973,289 A | * | 11/1990 | Leonard ....................... 474/49 |
| 5,011,458 A | * | 4/1991 | Kumm .......................... 474/49 |
| D325,184 S | | 4/1992 | Piller et al. |
| 5,458,543 A | | 10/1995 | Kobayashi |
| 5,950,488 A | * | 9/1999 | Abdallah ....................... 74/63 |
| 6,183,385 B1 | * | 2/2001 | Bakulich, Jr. ................ 474/49 |

* cited by examiner

*Primary Examiner*—David A. Bucci
*Assistant Examiner*—Timothy McAnulty

(57) ABSTRACT

A variable ratio sprocket assembly for providing improved transition between gears and eliminating derailing. The variable ratio sprocket assembly includes an axle, a bicycle wheel hub coupled to a rear wheel of the bicycle and designed to rotatably receive rotational force from a receiver, a receiver including a first diameter coupled to the bicycle wheel hub, a converter with a second diameter substantially greater than the diameter of the receiver slideably engages the receiver to provide a plurality of gear ratios with respect to the receiver, a driver includes a third diameter substantially greater than the second diameter of the converter and is slideably engaged by the converter such that rotating the driver in a first direction rotates the converter in a first direction which in turn rotates the receiver in a first direction which in turn rotates the rear bicycle wheel, and a sprocket coupled to an exterior surface of the driver designed for engaging a drive chain.

11 Claims, 3 Drawing Sheets

VARIABLE RATIO SPROCKET ASSEMBLY

BACKGROUND OF THE INVENTION

1. Field of the Invention

The present invention relates to gear assemblies and more particularly pertains to a new variable ratio sprocket assembly for providing improved transition between gears and eliminating derailing.

2. Description of the Prior Art

The use of gear assemblies is known in the prior art. More specifically, gear assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,850,939; 4,961,719; 3,800,613; 4,740,190; 5,458,543; and U.S. Pat. No. Des. 325,184.

While these devices fulfill their respective, particular objectives and requirements, the aforementioned patents do not disclose a new variable ratio sprocket assembly. The inventive device includes an axle providing a center for rotation coupled to a frame of the bicycle and designed to rotatably receive the rear bicycle wheel hub, a receiver includes a first diameter coupled to the rear bicycle wheel hub such that rotating the receiver rotates the rear wheel, a converter includes a second diameter substantially greater than the diameter of the receiver and slideably engages the receiver to provide a plurality of gear ratios with respect to the receiver, a driver includes a third diameter substantially greater than the second diameter of the converter and is slideably engaged by the converter such that rotating the driver in a first direction rotates the converter in a first direction which in turn rotates the receiver in a first direction which rotates the rear wheel in a first direction, and a sprocket coupled to an exterior surface of the driver designed for engaging a drive chain which rotates the sprocket.

In these respects, the variable ratio sprocket assembly according to the present invention substantially departs from the conventional concepts and designs of the prior art, and in so doing provides an apparatus primarily developed for the purpose of providing improved transition between gears and eliminating derailing.

SUMMARY OF THE INVENTION

In view of the foregoing disadvantages inherent in the known types of gear assemblies now present in the prior art, the present invention provides a new variable ratio sprocket assembly construction wherein the same can be utilized for providing improved transition between gears and eliminating derailing.

The general purpose of the present invention, which will be described subsequently in greater detail, is to provide a new variable ratio sprocket assembly apparatus and method which has many of the advantages of the gear assemblies mentioned heretofore and many novel features that result in a new variable ratio sprocket assembly which is not anticipated, rendered obvious, suggested, or even implied by any of the prior art gear assemblies, either alone or in any combination thereof.

To attain this, the present invention generally comprises an axle coupled to a frame of the bicycle providing a center for rotation, a bicycle wheel hub coupled to a rear wheel of the bicycle and designed to rotatably receive force from the sprocket assembly, a receiver includes a first diameter coupled to the bicycle wheel hub such that rotating the receiver rotates the rear wheel, a converter includes a second diameter substantially greater than the diameter of the receiver and slideably engages the receiver to provide a plurality of gear ratios with respect to the receiver, a driver includes a third diameter substantially greater than the second diameter of the converter and is slideably engaged by the converter such that rotating the driver in a first direction rotates the converter in a first direction which in turn rotates the receiver in a first direction which rotates the rear wheel, and a sprocket coupled to an exterior surface of the driver designed for engaging a drive chain which rotates the sprocket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new variable ratio sprocket assembly apparatus and method which has many of the advantages of the gear assemblies mentioned heretofore and many novel features that result in a new variable ratio sprocket assembly which is not anticipated, rendered obvious, suggested, or even implied by any of the prior art gear assemblies, either alone or in any combination thereof.

It is another object of the present invention to provide a new variable ratio sprocket assembly which may be easily and efficiently manufactured and marketed.

It is a further object of the present invention to provide a new variable ratio sprocket assembly which is of a durable and reliable construction.

An even further object of the present invention is to provide a new variable ratio sprocket assembly which is susceptible of a low cost of manufacture with regard to both materials and labor, and which accordingly is then susceptible of low prices of sale to the consuming public, thereby making such variable ratio sprocket assembly economically available to the buying public.

Theory of operation

The device consists of Four main components. The first three components consist of: the Driver, the Converter, and the Receiver. The additional label of "Transmitter" may be applied to the receiver, as it is the Receiver that transmits torque received from the Driver/Converter assembly to the rear wheel of the bicycle.

The process of delivering power to the rear wheel of the bicycle, and changing gear ratios proceeds as follows.

A standard chain is wrapped around a standard sprocket attached to the pedals of the bicycle, where torque begins. The chain is then wrapped around a second sprocket at the rear of the bicycle; this second sprocket is a structured part of the Driver. The Driver is a disc with a hole in the center—a hole less-than-equal to the diameter of the Converter, which is also a disc three-quarters the diameter of the Driver. The Converter also has a hole in the center—a hole less-than-equal to the diameter of the Receiver/Transmitter, which is a disc three-quarters the diameter of the Converter. The Driver and the Converter have a U-shaped cross-section. The Receiver/Transmitter fits inside the Converter, the Converter fits inside the Driver. The device in the first gear ratio is a system of concentric circles. The inner side-walls of the Driver and the Converter contain ridges shaped like stairs. The leading edges of these stair-shaped ridges face forward and begin at the diameter of the hole in the center of both the Driver and the Converter, and the leading edges of these ridges terminate at the outer diameter of both the Driver and the Converter respectively. The form and function of these ridges will be explained in further detail in later paragraphs.

The Converter and the Receiver/Transmitter are equipped with teeth at their outer diameters. These teeth are semicircle in shape; these teeth protrude from both sides of the Converter and the Receiver and are facing backwards. The backward-facing teeth of the Receiver/Transmitter make contact with the forward-facing leading edges of the stair-shaped ridges on the inner side-walls of the Converter. The backward-facing teeth of the Converter make contact with the forward-facing leading edges of the stair shaped ridges on the inner side-walls of the Driver. The interaction between these teeth and the stair-shaped ridges will be explained in later paragraphs.

Torque from the chain is delivered to the sprocket attached to the Driver; the Driver delivers this torque to the Converter via the stair-shaped ridges on the inner-side walls of the Driver making contact with the teeth structured to the Converter. The Converter delivers this torque to the Receiver via the stair-shaped ridges on the inner side-walls of the Converter making contact with the teeth structured to the Receiver. The Receiver transmits this torque to the rear wheel of the bicycle. The Receiver/Transmitter is attached to the rear wheel of the bicycle, in the standard and conventional method that current sprockets are attached to the rear wheel of a bicycle.

The fourth component of the device is the Hub and Shifter assembly, upon which the Driver and the Converter must rotate on. The Hub assembly is attached to the frame of the bicycle at the rear in line with the axle; the axle of the rear bicycle wheel is inserted through the center of the Hub and attaches to the bicycle frame in the standard and conventional method of current bicycles.

The Hub assembly consists of three main components: The Driver hub, the Converter hub and the Shifter.

The Driver hub is the main structure that supports the Converter hub and the Shifter. The Driver hub is attached to the bicycle frame; it is primarily flat and has a diameter equal to the hole in the center of the Driver. The one side-wall of the Driver facing away from the bicycle wheel is what contacts the Driver hub, providing a fixed position for the Driver to rotate. The Driver Hub and the Driver rotate smoothly with respect to each other.

The Driver Hub has parallel slits in its structure, these slits run from mid point and progress forward ending approximately an inch from the edge of the Driver Hub. There is one slit above the axle hole and one slit below the axle hole. These slits are spaced apart relative to the diameter of the Converter hub. The Converter hub is primarily flat and is equal in diameter to the hole in the Center of the Converter. The one side-wall of the Converter facing away from the bicycle wheel is what contacts the Converter hub, providing a fixed position for the Converter to rotate. Ball The Converter Hub and the Converter rotate smoothly with respect to each other. The Converter hub is located on the inner side of the Driver hub facing the bicycle wheel. There is a slot in the center of the Converter hub equal to the diameter of the bicycle wheel axle. The slot begins at mid point and runs backwards ending approximately half and inch from the edge of the Converter hub.

Additional structures to the Converter hub are two cylindrical rods, one at the top of the Converter hub and one at the bottom. These rods are perpendicular to the Converter hub and attach to the same side. These small cylindrical rods approximately an inch in length fix the Converter Hub to the Driver Hub in concentric alignment via the slits in the Driver hub. These rods are passed through the slits and attach to the Shifter located on the outside of the Driver hub. The Shifter is a simple metal structure whose function is to slide the Converter hub—and the Converter rotating around it—forward by degrees, out of concentric alignment. The Shifter slides along the slits in the Driver Hub via manual manipulation by the bicycle rider, using a lever affixed to the handle bars and conventional cable tension used on current bicycles to pull the Shifter forward. Utilizing biasing members attached from the Shifter to the Driver Hub, the shifter returns to its original position and thus returning the Converter hub back to its original position in concentric alignment with the Driver hub.

The function of the Variable Ratio Sprocket Assembly is as follows, beginning with the first gear ratio, all the components are in concentric alignment, thus the torque delivered by the chain is transmitted equally from the Driver, to the Converter, to the Receiver and to the bicycle wheel. One rotation of the Driver equals one rotation of the Receiver/Transmitter, equals one rotation to the wheel. When the Shifter pulls the Converter hub and thus the Converter out of concentric alignment with the Driver and the Receiver, the unit behaves similar to a chain a two sprockets. The Driver is the first and larger sprocket, the Converter plays the role of the chain, and the Receiver is the second and smaller sprocket. The teeth of the Converter are in contact with increasing numbers of the stair-shaped ridges on the inner side-walls of the Driver, and the teeth of the Receiver are in contact with increasing numbers of the stair-shaped ridges on the inner side-walls of the Converter. Depending on the gear ratio selected, one rotation of the Driver equals a multiplied rotation ratio of the Converter, and one rotation of the Converter equals a multiplied rotation ratio of the Receiver, increasing torque to the wheel.

The function of the Stair-shaped ridges is to transmit torque when the leading edge is in contact with the flexing teeth, between the Driver and the Converter, and between the Converter and the Receiver. When the Converter is pulled out of concentric alignment with the Driver and the Receiver, a reduced number of Converter teeth come in alignment with the leading edge of the ridges on the inner side-walls of the Driver as the diameter increases. Likewise, a reduced number of Receiver teeth come in alignment with the leading edge of the ridges on the inner side-walls of the Converter as the diameter increases. Thus the flexing teeth of the Converter and the Receiver will squeeze in and slide along the trailing edge of the ridges, until the rotation brings the teeth into alignment with the leading edge of the ridges and torque is transmitted. When the teeth no longer align with the leading edge of the ridges as rotation progresses, the flexing teeth will again squeeze in and slide along the trailing edge of the ridges until they are liberated in the open space between the Driver and the Converter, and between the Converter and the Receiver. As rotation continues, the teeth return to make contact with the trailing edge of the ridges and will squeeze in and slide until the teeth align and are in contact with the leading edge of the ridges again where torque is transmitted. The leading edge transmits torque, while the trailing edge allows free rotation of flexing teeth when torque is reversed. In the case of the variable ratio sprocket assembly, increased rotational ratios and misalignment replace reversed torque to achieve slipping along the trailing edge of the ridges.

Regarding the structure of the Stair-shaped ridges. The leading edges of the ridges are parallel beginning from the smallest diameter and progressing to the largest diameter, for both the Driver and the Converter. The ridges do not taper outward as they reach the outer diameter, as this will not allow the flexing teeth to achieve true alignment when the Converter is shifted to the outer diameters. The ridges are designed in four quadrants; the four quadrants of ridges meet each other at right angles. The trailing edges of the ridges of a first quadrant will meet the leading edge of the next quadrant at right angles. This is repeated for each quadrant to form the ridge pattern. The increase in diameter increases the number of ridges per circumference. As the Converter shifts out of concentric alignment, the flexing teeth of the Converter and Receiver will receive torque from increased numbers of ridges of the increased circumferences between the Driver and the Converter, and between the Converter and the Receiver, and ratios are increased.

With this as an understanding of the theory of operation, the preferred embodiment will be described in detail.

Still yet another object of the present invention is to provide a new variable ratio sprocket assembly which provides in the apparatuses and methods of the prior art some of the advantages thereof, while simultaneously overcoming some of the disadvantages normally associated therewith.

Still another object of the present invention is to provide a new variable ratio sprocket assembly for providing improved transition between gears and eliminating derailing.

Yet another object of the present invention is to provide a new variable ratio sprocket assembly which includes an axle providing a center for rotation, a bicycle wheel hub coupled to a rear wheel of the bicycle and designed to rotatably receive force from the sprocket assembly, a receiver includes a first diameter coupled to the rear wheel hub such that rotating the receiver rotates the wheel, a converter includes a second diameter substantially greater than the diameter of the receiver and slideably engages the receiver to provide a plurality of gear ratios with respect to the receiver, a driver includes a third diameter substantially greater than the second diameter of the converter and is slideably engaged by the converter such that rotating the driver in a first direction rotates the converter in a first direction which in turn rotates the receiver in a first direction which rotates the rear wheel, and a sprocket coupled to an exterior surface of the driver designed for engaging a drive chain which rotates the sprocket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
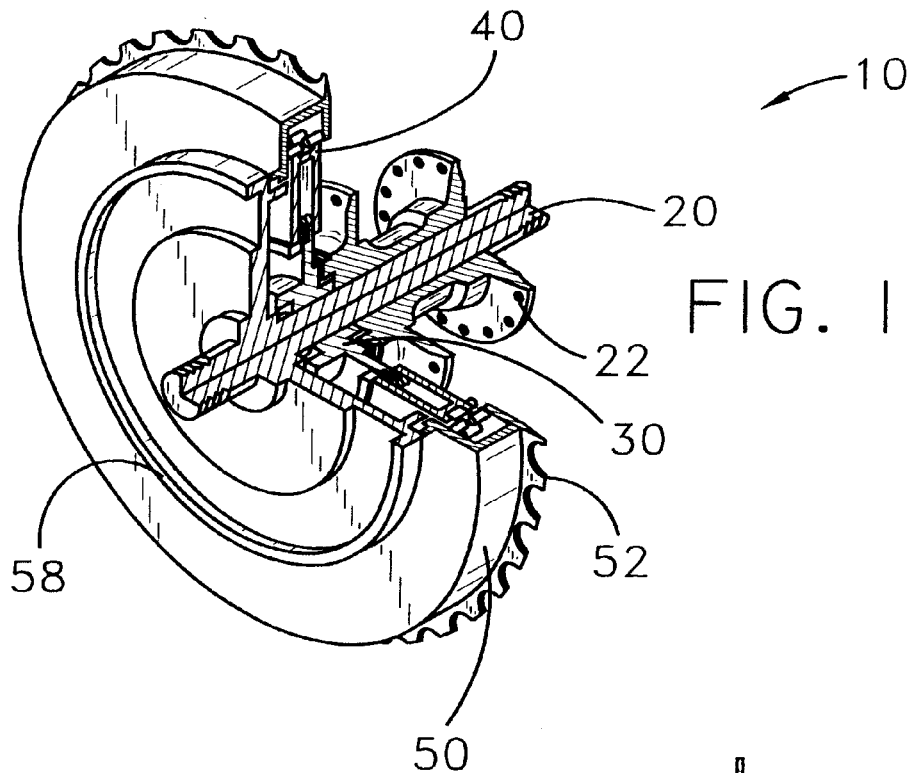
FIG. 1 is a schematic perspective view of a new variable ratio sprocket assembly according to the present invention.
Figure 2:
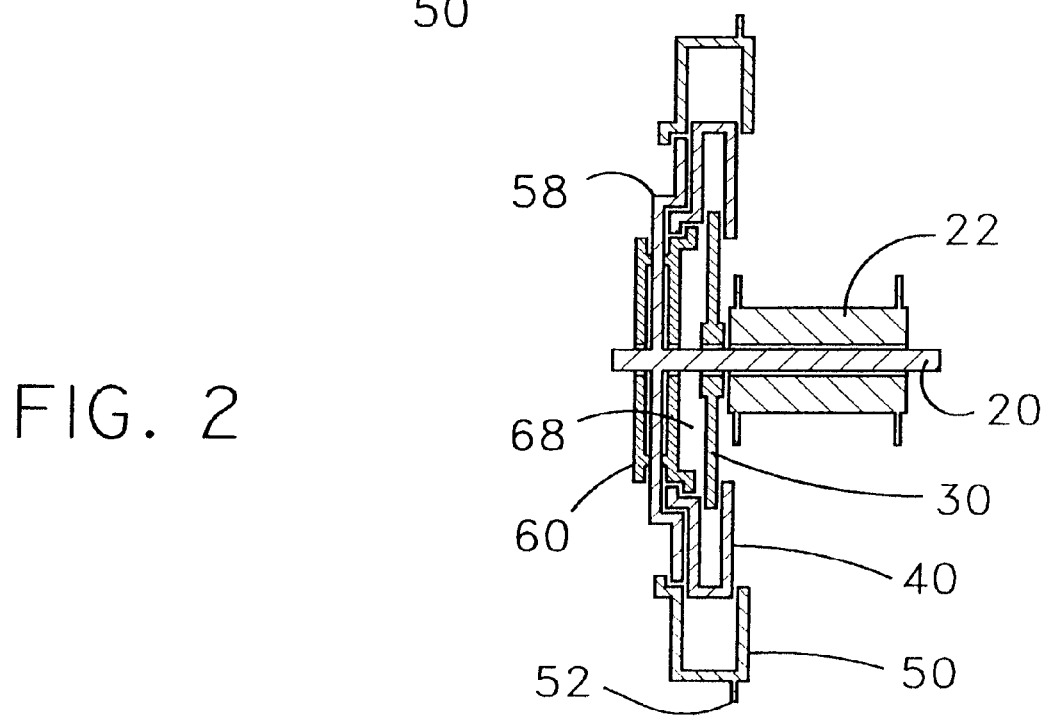
FIG. 2 is a schematic cross-sectional view of the present invention.
Figure 3:
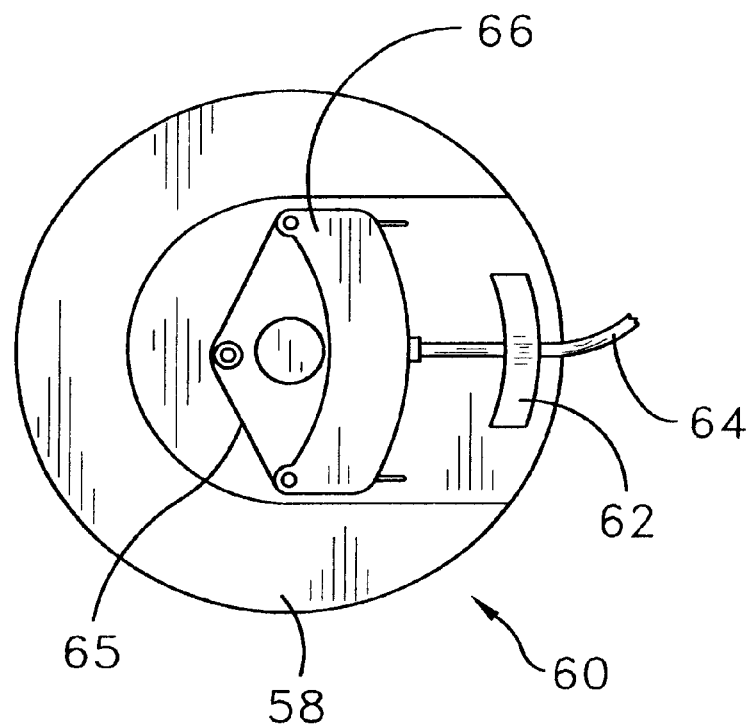
FIG. 3 is a schematic front view of the driver hub and shifter assembly of the present invention.
Figure 4:
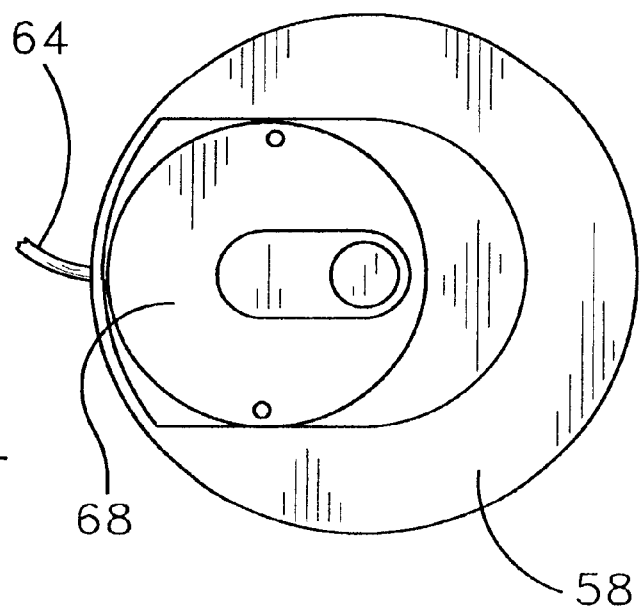
FIG. 4 is a schematic interior view of the driver hub and shifter assembly of the present invention.
Figure 5:
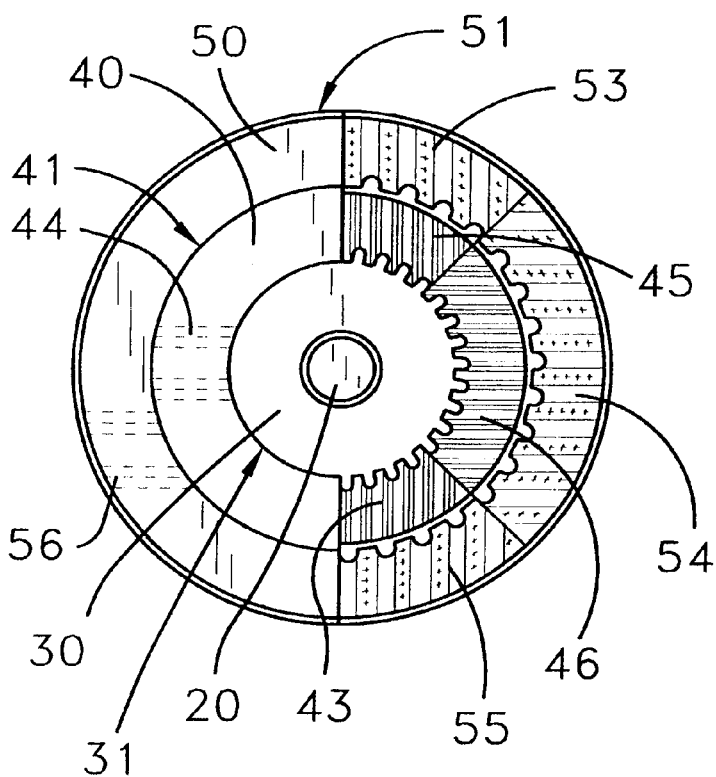
FIG. 5 is a schematic front view of the driver, converter and receiver of the present invention.
Figure 6:
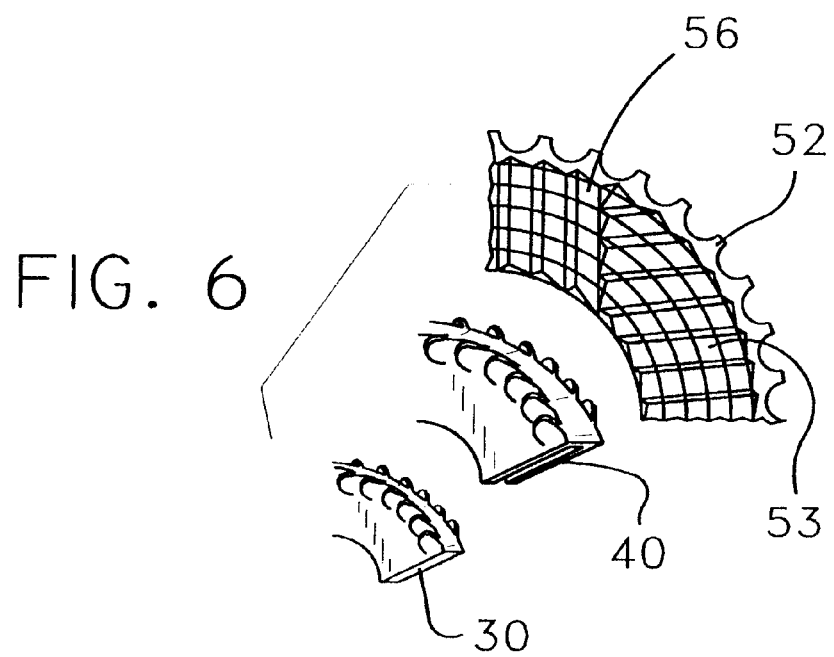
FIG. 6 is a schematic perspective view of the driver converter, and receiver of the present invention.

With reference now to the drawings, and in particular to FIGS. 1 through 6 thereof, a new variable ratio sprocket assembly embodying the principles and concepts of the present invention and generally designated by the reference numeral 10 will be described.

As best illustrated in FIGS. 1 through 6, the variable ratio sprocket assembly 10 generally comprises an axle 20, a bicycle wheel hub 22, a receiver 30, a converter 40, a driver 50, a sprocket 52, a shifter assembly 60, and a driver hub 58.

The axle 20 provides a center for rotation. The bicycle wheel hub 22 revolves around the axle 20.

The receiver 30 includes a first diameter 31. The receiver 30 is coupled to the bicycle wheel hub 22 such that rotating the receiver 30 rotates the bicycle wheel hub 22. The converter 40 includes a second diameter 41, which is substantially greater than the diameter of the receiver 30. The converter 40 is used to slideably engage the receiver 30. The converter 40 provides a plurality of gear ratios with respect to the receiver 30. The converter 40 substantially rotates around the axle 20.

The driver 50 includes a third diameter 51, which is substantially greater than the second diameter 41 of the converter 40. The driver 50 is slideably engaged by the converter 40. Thus rotating the driver 50 in a first direction rotates the converter 40 in a first direction which in turn rotates the receiver 30 in a first direction.

The sprocket 52 is coupled to an exterior surface of the driver 50. The sprocket 52 is designed for engaging a drive chain such that the drive chain rotates the sprocket 52, which rotates the driver 50.

The driver hub 58 is coupled to the axle 20. The driver hub 58 is for positioning the driver 50 such that a diameter of the driver 50 is in a spaced parallel relationship with an axis of the axle 20.

The shifter assembly 60 is coupled to the driver hub 58. The shifter assembly 60 is for positioning the converter 40 within the driver 50.

In an embodiment the shifter assembly 60 further comprises an anchor block 62, a cable member 64, a slideable member 66, and a converter hub 68. The anchor block 62 is coupled to an exterior face of the driver hub 58. The anchor bock 62 provides a stationary reference for the shifter assembly 60. The cable member 64 includes an interior member and an exterior sleeve member. The exterior sleeve member is coupled to the anchor block 2. The interior member is moveable with reference to the exterior sleeve member. The slideable member 66 is coupled to the exterior face of the driver hub 58. The slideable member 66 is moveable along the face from a substantially medial location radially outward. A biasing member 65 is coupled to the exterior surface of the driver hub 58. The biasing member 65 urges the slideable member 66 towards a medial position in opposition to the interior member of the cable member 64. The converter hub 68 is positioned on an interior face of the driver hub 58. The converter hub 68 is slideably coupled to the slideable member 66 such that when the cable member 64 moves the slideable member 66 radially outward from a medial position, the slideable member 66 moves the converter hub 68 radially outward from a medial position.

In an embodiment the driver 50 includes a substantially u-shaped cross-section. The driver 50 includes a plurality of teeth positioned on an interior surface. The teeth provide a mechanical contact point for transmission of a rotational force from the driver 50 such that rotating the driver 50 rotates the converter 40.

In a further embodiment the plurality of teeth comprises a first 53, second 54, third 55 and fourth driver-quadrant plurality of teeth 56. The first driver-quadrant plurality of teeth 53 is oriented in a first direction. The first driver-quadrant plurality of teeth 53 is positioned in a linear spaced array along a first one fourth of the driver 50. The second driver-quadrant plurality of teeth 54 is oriented in a second direction. The second direction is oriented perpendicular to the first direction. The second driver-quadrant plurality of teeth 54 is positioned in a linear spaced array along a second one fourth of the driver 50. The second one forth is positioned adjacent to the first one fourth. The third driver-quadrant plurality of teeth 55 is oriented in the first direction. The third driver-quadrant plurality of teeth 55 is positioned in a linear spaced array along a third one fourth of the driver 50. The third driver-quadrant plurality of teeth 55 is positioned adjacent to the second plurality of teeth 54. The fourth driver-quadrant plurality of teeth 56 is oriented in the second direction. The fourth driver-quadrant plurality of teeth 56 is positioned in a linear spaced array along a fourth one fourth of the driver. The fourth driver-quadrant plurality of teeth 56 is positioned adjacent to the third driver-quadrant plurality of teeth 55 and the first driver-quadrant plurality of teeth 53. The plurality of teeth is used to facilitate ratcheting of the driver 50 and the converter 40.

In still a further embodiment the converter 40 includes a substantially u-shaped cross-section. The converter 40 includes a plurality of teeth positioned on an interior surface. The teeth providing a mechanical contact point for transmission of a rotational force from the converter 40 such that rotating the converter 40 rotates the receiver 30.

In still yet a further embodiment the plurality of teeth comprises: a first 43, second 44, third 45, and fourth converter quadrant plurality of teeth 46. The first converter-quadrant plurality of teeth 43 is oriented in a first direction. The first converter-quadrant plurality of teeth 43 is positioned in a linear spaced array along a first one fourth of the converter. The second converter-quadrant plurality of teeth 44 is oriented in a second direction. The second direction is oriented perpendicular to the first direction. The second converter-quadrant plurality of teeth 44 is positioned in a linear spaced array along a second one fourth of the converter 40. The second one forth is positioned adjacent to the first one fourth. The third converter-quadrant plurality of teeth 45 is oriented in the first direction. The third converter-quadrant plurality of teeth 45 is positioned in a linear spaced array along a third one fourth of the converter. The third converter-quadrant plurality of teeth 45 is positioned adjacent to the second plurality of teeth 44. The fourth converter-quadrant plurality of teeth 46 is oriented in the second direction. The fourth converter-quadrant plurality of teeth 46 is positioned in a linear spaced array along a fourth one fourth of the converter 40. The fourth converter-quadrant plurality of teeth 46 is positioned adjacent to the third converter-quadrant plurality of teeth 45 and the first converter-quadrant plurality of teeth 43. The plurality of teeth is used to facilitate ratcheting of the converter 40 and the receiver 30.

In an embodiment the shifter assembly 60 slideably engages the converter hub 68 and urges the converter hub 68 radially outward from a medial position such that the converter hub 68 establishes a rotation for the converter 40 substantially around the axle 20. The converter 40 engages the driver 50 at a plurality of predefined circumferences establishing a plurality of different gear ratios.

In a further embodiment the plurality of gear ratios comprises six gear ratios.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A variable ratio sprocket assembly for use on a bicycle or other chain drive system requiring multiple gear ratios comprising:

an axle providing a center for rotation, coupled to a frame of the bicycle;

a bicycle wheel hub coupled to a rear wheel of the bicycle, said bicycle wheel hub being coupled to a receiver;

said receiver having a first diameter, said receiver being coupled to said bicycle wheel hub such that rotating said receiver rotates said bicycle wheel;

a converter having a second diameter substantially greater than said diameter of said receiver, said converter slidably engaging said receiver, said converter providing a plurality of gear ratios with respect to said receiver, said converter being substantially rotated around said axle;

a driver having a third diameter substantially greater than said second diameter of said converter, said driver being slideably engaged by said converter whereby rotating said driver in a first direction rotates said converter in a first direction which in turn rotates said receiver in a first direction; and a sprocket coupled to an exterior surface of said driver, said sprocket being adapted for engaging a drive chain whereby said drive chain rotates said sprocket.

2. The variable ratio sprocket assembly of claim 1, further comprising:

a driver hub coupled to said axle, said driver hub being for positioning said driver such that a diameter of said driver is in a spaced parallel relationship with an axis of said axle;

a shifter assembly coupled to said driver hub, said shifter assembly being for positioning said converter within said driver.

3. The variable ratio sprocket assembly of claim 2, wherein said shifter assembly further comprises:

an anchor block coupled to an exterior face of said driver hub, said anchor bock providing a stationary reference for said shifter assembly;

a cable member having an interior member and an exterior sleeve member, said exterior sleeve member being coupled to said anchor block, said interior member being moveable with reference to said exterior sleeve member;

a slideable member coupled to said exterior face of said driver hub, said slideable member being moveable along said face from a substantially medial location radially outward; and a biasing member coupled to said exterior surface of said driver hub, said biasing member urging said slideable member towards a medial position in opposition to said interior member of said cable member.

4. The variable ratio sprocket assembly of claim 3, wherein said shifter assembly further comprises:

a converter hub positioned on an interior face of said driver hub, said converter hub being slideably coupled to said slideable member such that when said cable member moves said slideable member radially outward from a medial position, said slideable member moves said converter hub radially outward from a medial position.

5. The variable ratio sprocket system of claim 4, further comprising:

wherein said shifter assembly slideably engages said converter hub radially outward from a medial position said converter engaging said driver at a plurality of predefined circumferences establishing a plurality of different gear ratios.

6. The variable ratio sprocket assembly of claim 1, further comprising:

wherein said driver having a substantially u-shaped cross-section, said driver having a plurality of teeth positioned on an interior surface, said teeth providing a mechanical contact point for transmission of a rotational force from said driver such that rotating said driver rotates said converter.

7. The variable ratio sprocket assembly of claim 6, wherein said plurality of teeth comprises:

a first quadrant plurality of teeth oriented in a first direction, said first quadrant plurality of teeth being positioned in a linear spaced array along a first one fourth of said driver, a second quadrant plurality of teeth oriented in a second direction, said second direction being oriented perpendicular to said first direction, said second quadrant plurality of teeth being positioned in a linear spaced array along a second one fourth of said driver, said second one forth being positioned adjacent to said first one fourth, a third quadrant plurality of teeth oriented in said first direction, said third quadrant plurality of teeth being positioned in a linear spaced array along a third one fourth of said driver, said third quadrant plurality of teeth being positioned adjacent to said second plurality of teeth, a fourth quadrant plurality of teeth oriented in said second direction, said fourth quadrant plurality of teeth being positioned in a linear spaced array along a fourth one fourth of said driver, said fourth quadrant plurality of teeth being positioned adjacent to said third quadrant plurality of teeth and said first quadrant plurality of teeth, said plurality of teeth being used to facilitate ratcheting of said driver and said converter.

8. The variable ratio sprocket assembly of claim 1, further comprising;

wherein said converter having a substantially u-shaped cross-section, said converter having a plurality of teeth positioned on an interior surface, said teeth providing a mechanical contact point for transmission of a rotational force from said converter such that rotating said converter rotates said receiver.

9. The variable ratio sprocket assembly of claim 8, wherein said plurality of teeth comprises:

a first quadrant plurality of teeth oriented in a first direction, said first quadrant plurality of teeth being positioned in a linear spaced array along a first one fourth of said converter, a second quadrant plurality of teeth oriented in a second direction, said second direction being oriented perpendicular to said first direction, said second quadrant plurality of teeth being positioned in a linear spaced array along a second one fourth of said converter, said second one forth being positioned adjacent to said first one fourth, a third quadrant plurality of teeth oriented in said first direction, said third quadrant plurality of teeth being positioned in a linear spaced array along a third one fourth of said converter, said third quadrant plurality of teeth being positioned adjacent to said second plurality of teeth, a fourth quadrant plurality of teeth oriented in said second direction, said fourth quadrant plurality of teeth being positioned in a linear spaced array along a fourth one fourth of said converter, said fourth quadrant plurality of teeth being positioned adjacent to said third quadrant plurality of teeth and said first quadrant plurality of teeth, said plurality of teeth being used to facilitate ratcheting of said converter and said receiver.

10. A variable ratio sprocket assembly for use on a bicycle or other chain drive system requiring multiple gear ratios comprising:

an axle providing a center for rotation;

a bicycle wheel hub coupled to a rear wheel of the bicycle, said bicycle wheel hub being coupled to said receiver;

a receiver having a first diameter, said receiver being coupled to said bicycle wheel hub such that rotating said receiver rotates said bicycle wheel hub;

a converter having a second diameter substantially greater than said diameter of said receiver, said converter being slideably engaging said receiver, said converter providing a plurality of gear ratios with respect to said receiver, said converter being substantially rotated around said axle;

a driver having a third diameter substantially greater than said second diameter of said converter, said driver being slideably engaged by said converter whereby rotating said driver in a first direction rotates said converter in a first direction which in turn rotates said receiver in a first direction;

a sprocket coupled to an exterior surface of said driver, said sprocket being adapted for engaging a drive chain whereby said drive chain rotates said sprocket;

a driver hub coupled to said axle, said driver hub being for positioning said driver such that a diameter of said driver is in a spaced parallel relationship with an axis of said axle;

a shifter assembly coupled to said driver hub, said shifter assembly being for positioning said converter within said driver;

wherein said shifter assembly further comprises:
  an anchor block coupled to an exterior face of said driver hub, said anchor bock providing a stationary reference for said shifter assembly;
  a cable member having an interior member and an exterior sleeve member, said exterior sleeve member being coupled to said anchor block, said interior member being moveable with reference to said exterior sleeve member;
  a slideable member coupled to said exterior face of said driver hub, said slideable member being moveable along said face from a substantially medial location radially outward; and
  a biasing member coupled to said exterior surface of said driver hub, said biasing member urging said slideable member towards a medial position in opposition to said interior member of said cable member;

a converter hub positioned on an interior face of said driver hub, said converter hub being slideably coupled to said slideable member such that when said cable member moves said slideable member radially outward from a medial position, said slideable member moves said converter hub radially outward from a medial position;

wherein said driver having a substantially u-shaped cross-section, said driver having a plurality of teeth positioned on an interior surface, said teeth providing a mechanical contact point for transmission of a rotational force from said driver such that rotating said driver rotates said converter;

wherein said plurality of teeth comprises:
  a first driver-quadrant plurality of teeth oriented in a first direction, said first driver-quadrant plurality of teeth being positioned in a linear spaced array along a first one fourth of said driver,
  a second driver-quadrant plurality of teeth oriented in a second direction, said second direction being oriented perpendicular to said first direction, said second driver-quadrant plurality of teeth being positioned in a linear spaced array along a second one fourth of said driver, said second one forth being positioned adjacent to said first one fourth,
  a third driver-quadrant plurality of teeth oriented in said first direction, said third driver-quadrant plurality of teeth being positioned in a linear spaced array along a third one fourth of said driver, said third driver-quadrant plurality of teeth being positioned adjacent to said second plurality of teeth,
  a fourth driver-quadrant plurality of teeth oriented in said second direction, said fourth driver-quadrant plurality of teeth being positioned in a linear spaced array along a fourth one fourth of said driver, said fourth driver-quadrant plurality of teeth being positioned adjacent to said third driver-quadrant plurality of teeth and said first driver-quadrant plurality of teeth,
  said plurality of teeth being used to facilitate ratcheting of said driver and said converter wherein said converter having a substantially u-shaped cross-section, said converter having a plurality of teeth positioned on an interior surface, said teeth providing a mechanical contact point for transmission of a rotational force from said converter such that rotating said converter rotates said receiver, wherein said plurality of teeth comprises:
  a first converter-quadrant plurality of teeth oriented in a first direction, said first converter-quadrant plurality of teeth being positioned in a linear spaced array along a first one fourth of said converter,
  a second converter-quadrant plurality of teeth oriented in a second direction, said second direction being oriented perpendicular to said first direction, said second converter-quadrant plurality of teeth being positioned in a linear spaced array along a second one fourth of said converter, said second one forth being positioned adjacent to said first one fourth,
  a third converter-quadrant plurality of teeth oriented in said first direction, said third converter-quadrant plurality of teeth being positioned in a linear spaced array along a third one fourth of said converter, said third converter-quadrant plurality of teeth being positioned adjacent to said second plurality of teeth,
  a fourth converter-quadrant plurality of teeth oriented in said second direction, said fourth converter-quadrant plurality of teeth being positioned in a linear spaced array along a fourth one fourth of said converter, said fourth converter-quadrant plurality of teeth being positioned adjacent to said third converter-quadrant plurality of teeth and said first converter-quadrant plurality of teeth, said plurality of teeth being used to facilitate ratcheting of said converter and said receiver.

11. The variable ratio sprocket system of claim 10 wherein said plurality of gear ratios comprises six gear ratios.

* * * * *